G. M. WILLIS.
ELECTRIC METER.
APPLICATION FILED JAN. 5, 1910.

1,084,720.

Patented Jan. 20, 1914.

3 SHEETS—SHEET 3.

Witnesses
George C. Higham
Leonard W. Novander

Inventor
George M. Willis
By Brown & Williams
Attorneys

UNITED STATES PATENT OFFICE.

GEORGE M. WILLIS, OF CHICAGO, ILLINOIS, ASSIGNOR, BY MESNE ASSIGNMENTS, TO CHICAGO ELECTRIC METER COMPANY, OF CHICAGO, ILLINOIS, A CORPORATION OF ILLINOIS.

ELECTRIC METER.

1,084,720.

Specification of Letters Patent.

Patented Jan. 20, 1914.

Application filed January 5, 1910. Serial No. 536,550.

*To all whom it may concern:*

Be it known that I, GEORGE M. WILLIS, a citizen of the United States, residing at Chicago, in the county of Cook and State of Illinois, have invented certain new and useful Improvements in Electric Meters, of which the following is a full, clear, concise, and exact description, reference being had to the accompanying drawings, forming a part of this specification.

My invention relates to electricity meters and has for its object the simplification of meters of this class adapted to register the quantity of electricity flowing in any given circuit.

It is an object of my invention to provide an improved form of terminal post and an improved means for sealing such posts so they may not be accessible generally but may only be reached by a person having the proper authority.

It is a further object of my invention to provide means for securing the field coil of the meter in place upon its supporting seat such retaining means also constituting an armature protecting means.

It is a further object of my invention to secure the cover of the meter in place in such a manner that the securing means are permanently retained in the cover and cannot by accident be lost. The means employed to secure the retaining means in the cover also serves to effectively close the openings through the cover when the cover is in place upon the meter.

It is the further object of my invention to provide an improved means for regulating the tension exerted upon the brushes bearing upon the commutator connected with the rotatable armature of the meter, in order that any desired spring tension once secured may be permanently retained.

Figure 1:
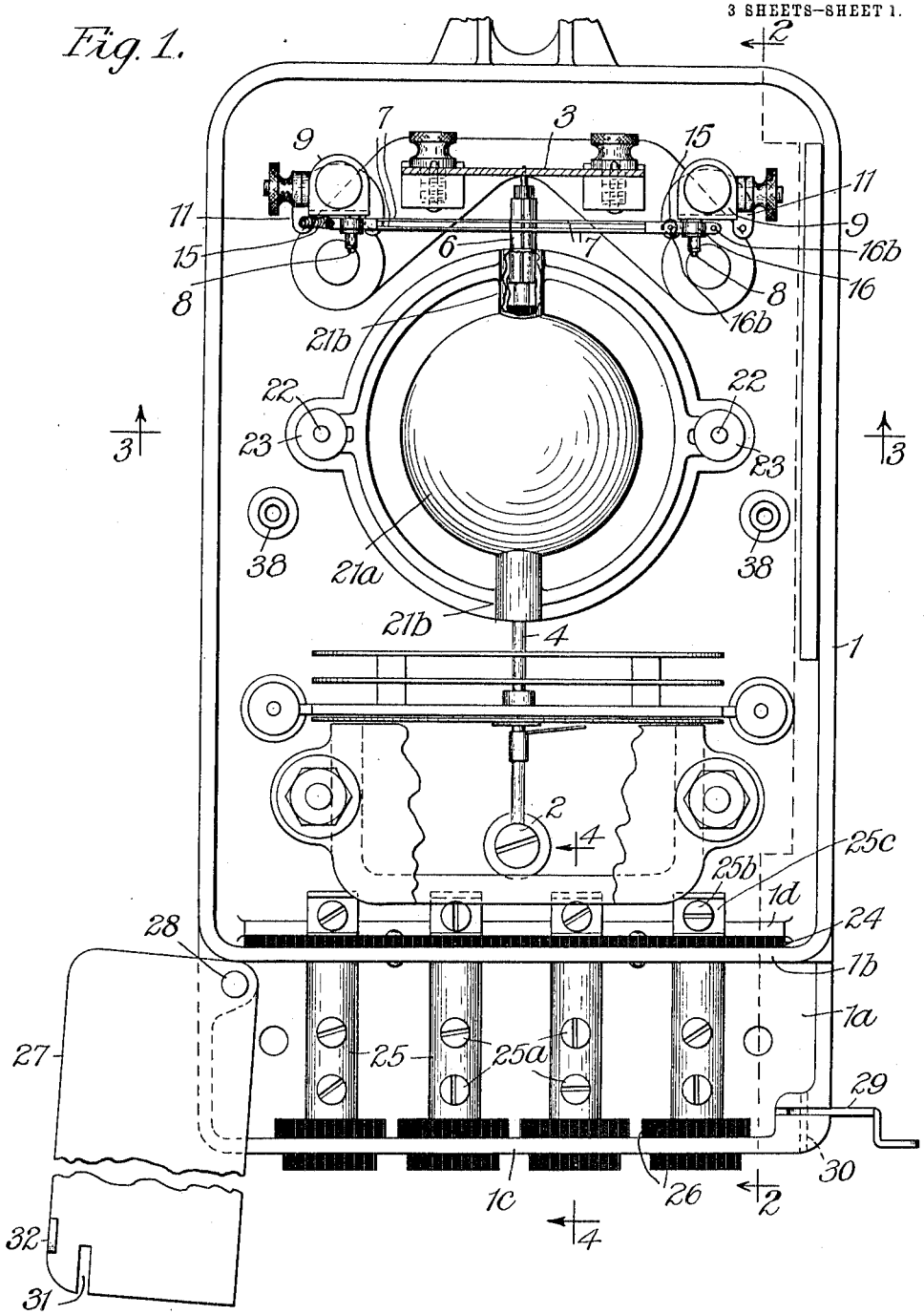
Figure 2:
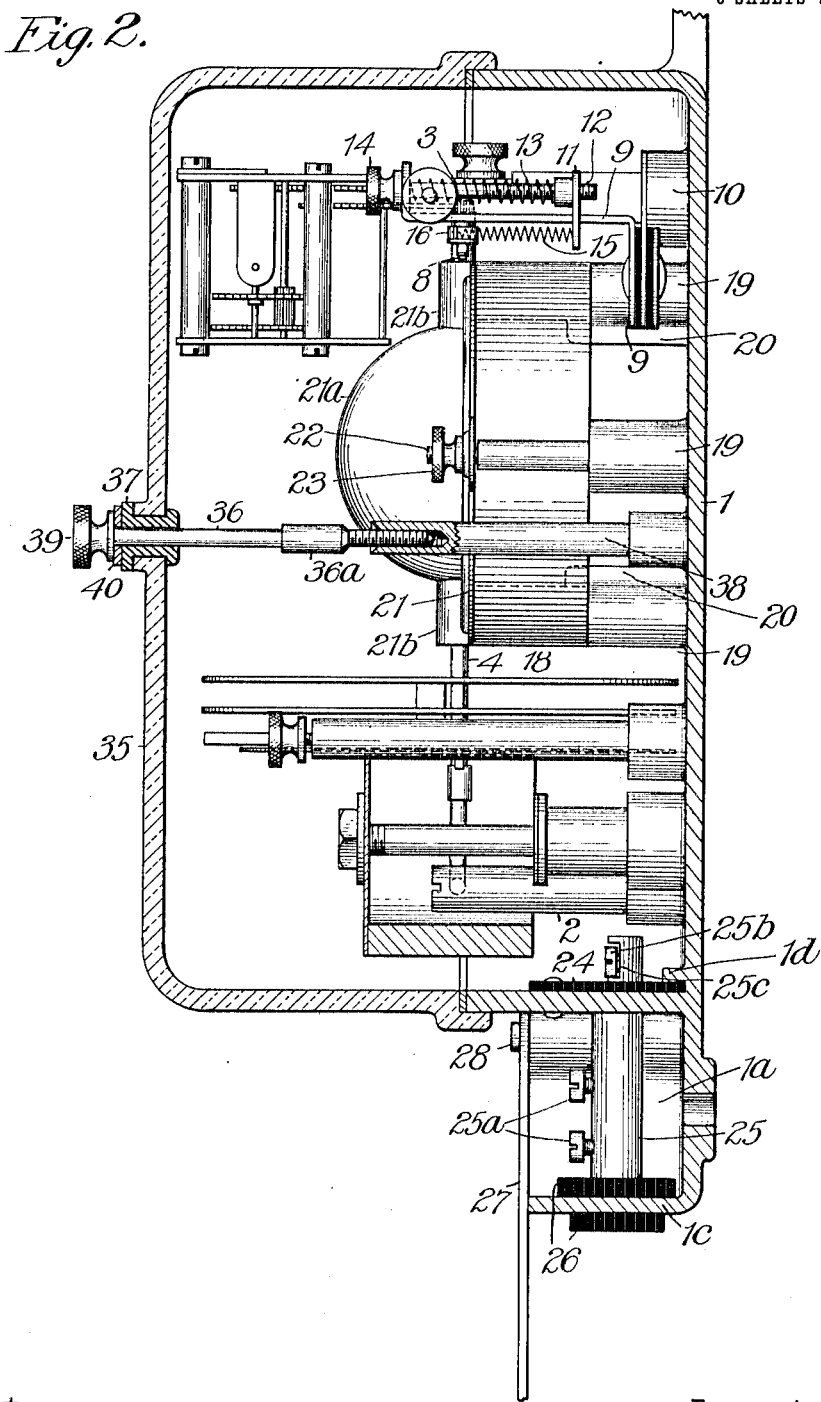
Figure 3:
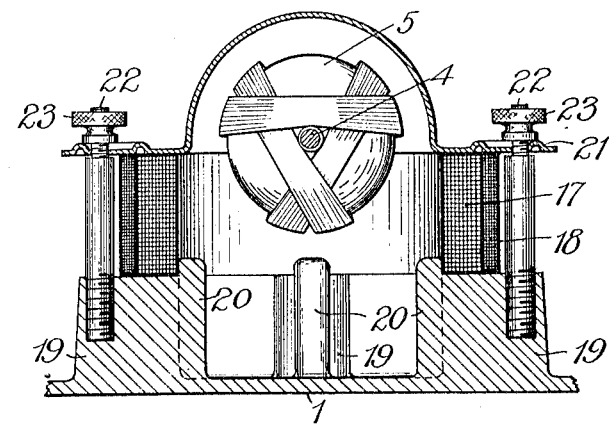
Figure 5:
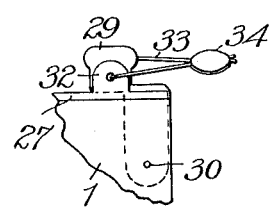
Figure 6:
Figure 4:
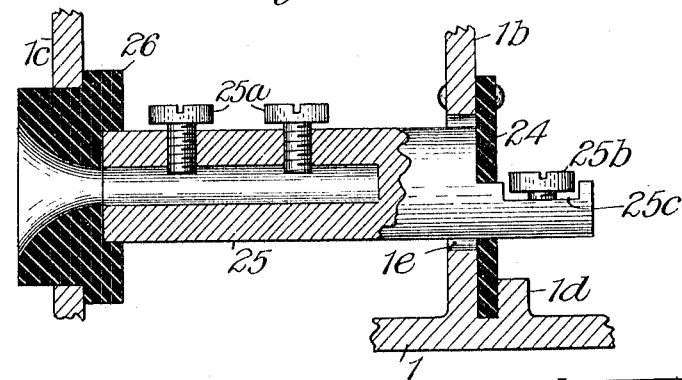

The several drawings illustrating my invention are as follows:

Figure 1 is an elevation view of my meter complete. Fig. 2 is a sectional view of the parts shown in Fig. 1 taken along the line 2—2. Fig. 3 is a sectional view of the parts shown in Fig. 1 taken along the line 3—3, with the exception that the armature in this figure is shown in full lines. Fig. 4 is a sectional view of one of the connectors and its insulating supports shown in Fig. 1 taken along the line 4—4. Fig. 5 is a detail view of the sealing means employed to retain the cover of the terminal box in place. Fig. 6 is a detail view of the brush construction employed in connection with my meter.

Similar numerals refer to similar parts throughout the several views.

As shown in the drawings, the casing 1 supports by bearings 2 and 3 an armature shaft 4 upon which is mounted, as shown in Fig. 3, the armature 5. The shaft 4 carries near its upper end the commutator 6 upon which bear the brushes 7 supported by the studs 8 from the brackets 9 which brackets, as shown in Fig. 2, are supported and insulated from the bosses 10 formed on the base 1. As shown in Fig. 2, the brackets 9 carry adjustable yokes 11 which are engaged by the screws 12 extending through the outer bent ends of such brackets 9. Springs 13 are disposed around the screws 12 to positively hold the yokes 11 in any desired position to which they may be moved on the brackets 9 by the milled heads 14 secured to the ends of the screws 12. The yokes 11 have connected to them one end of the springs 15, the other ends of which are connected with the brush holders 16. As a result of this arrangement, by moving the yokes 11 upon the brackets 9 any desired tension may be exerted upon the springs 15 and thus the brushes 7 may be caused to bear with any desired pressure upon the commutator 6 and in any adjustment the springs 13 serve to positively hold the yokes 11 in place since these springs 13 are comparatively stiff.

The armature 5, as shown in Fig. 3 is disposed to rotate within the field coil 17 around which is wound the starting coil 18. The field coil and starting coil are assembled together and constitute a single structure mechanically which is supported by lugs 19 extending from the base 1 which lugs carry the integral extensions 20 adapted to engage the inside surface of the field coil 17. The extensions 20 thus serve to accurately locate the field coil relatively to the armature 5 since the field coil is always wound upon a mandrel of exact diameter and thus has a constant internal diameter, whereas the outside diameter may vary considerably and is not, therefore, as reliable for determining the location of the field coil. When in place upon the seat formed by the lugs 19 the field and series coils are held in position by a ring 21 through which clamping screws 22 extend. These screws are secured at their lower ends in two diametrically opposite lugs 19 and by removing the clamping nuts 23 from the screws 22 the ring 21 may be removed and thus the field coil may be removed from the meter. The ring 21 has formed integrally therewith a central hemispherical portion adapted to surround and protect the armature 5 and prevent mechanical injury of the armature windings. From the central hemispherical portion 21$^a$ semicylindrical portions extend at the top and bottom to clear the commutator 6 and the armature shaft 4.

The brushes herein shown consist of loops of silver wire secured at their folded portions in any suitable manner to strips of metal 16$^a$ carried by the brush holders 16 which in turn are supported by the studs 8 from the brackets 9. Two holes 16$^b$ are provided in each of the strips 16$^a$ in order that the complete brushes and brush holders may be interchangeable, these holes being provided to receive the outer ends of the springs 15, the particular hole which is used in each case being determined by whether the brush rests above or below the commutator.

Below the meter casing proper, which is preferably of nonmagnetic material the terminal compartment 1$^a$ is formed to contain the connecting means for receiving the outside conductors. This compartment 1$^a$ is inclosed at the top by the lower wall 1$^b$ of the casing of the meter proper and this wall 1$^b$ has secured thereto by means of rivets a strip of insulation 24 which engages and retains the upper end of the connectors 25. These connectors 25 consist of round rods of metal flattened at their upper ends to engage semicircular openings in the strip 24 while the lower ends are supported by bushings 26 of insulating material supported in circular openings in the lower wall 1$^c$ of the compartment 1$^a$. The lower edge of the insulating strip 24 is held in place against the partition 1$^b$ by means of the flange 1$^d$ extending parallel with the partition 1$^b$ from the base 1 and when such strip of insulation is inserted in place and riveted to the partition 1$^b$ after the connectors 25 are properly located, it will be observed that such connectors are securely held in place and cannot be accidentally removed. Suitable clearances 1$^e$ are provided in the partition 1$^b$ to prevent electrical contact between the connectors 25 and the casing of the meter.

The binding screws 25$^a$ serve to make connection with an external conductor entering the meter through the bushing 26 while the screw 25$^b$ is provided to make connection with the wiring of the meter. The screw 25$^b$ is adapted to press the conductor engaged thereby against the bottom of the groove 25$^c$ formed transversely of the connector 25 in its flattened end, the sides of such groove serving to prevent the conductor from becoming disengaged from the head of the screw 25$^b$.

The compartment 1$^a$ is provided with a cover 27 hinged to the meter casing at 28 and in its closed position adapted to be engaged by means of the bent catch 29 pivoted to the meter casing at 30. The catch 29 enters a slot 31 in the cover 27 and thus serves to prevent angular motion of the cover and the bent portion of the catch resting on the top of the cover when in its closed position, as shown in Fig. 5, firmly holds the cover down against the walls of the compartment 1$^a$. In this position an opening in the outer end of the catch 29 is brought into alinement with the opening in the lug 32 carried by the cover 27 and the sealing wire 33 is then passed through such registering openings and held in place by a seal 34.

The cover 35 is held securely in place by means of the screws 36 passing through bushings 37, the threaded ends of such screws engaging the posts 38 extending outward from the base 1 of the meter. The screws 36 have secured thereto at their outer ends milled heads 39 by which the screws may be turned and such screws are provided at their central portions with enlargements 36$^a$ adapted to prevent the ready withdrawal of the screws through the bushings 37. The bushings are preferably of soft material, as rubber in order to seal the openings through the cover 35 when the screws 36 are turned so as to bring the heads 39 positively into engagement with the washers 40 which rest upon such bushings 37. It is to be noted that the bushings 37 have flanges on each end, the inner flanges serving to prevent the withdrawal of the bushings from the cover 35 while the outer flanges serve to engage the washers 40. The outer ends of the posts 38 are countersunk and the ends of the screws 36 are pointed to facilitate the entry of the screws into the ends of the posts.

While I have shown my invention in the particular embodiments herein described, I do not, however, limit myself to this construction, but desire to claim broadly any equivalent that may suggest itself to those skilled in the art.

What I claim is:

1. In an electric meter, the combination of a casing, a cover for the operating mechanism of the meter, posts extending from the casing, screws passing through the cover adapted to engage the posts, and bushings having enlarged ends and being of resilient material adapted to retain such screws in the cover, each of said screws being conformed to engage the ends of its bushing to prevent the ready withdrawal of the screw therefrom.

2. In an electric meter, the combination of a base, a rotatable armature, a field coil for such armature, and a cover plate adapted to retain such coil in position and to cover and protect such armature.

3. In an electric meter, the combination of a base, a rotatable armature supported from the base, a field coil disposed in operative relation to such armature, lugs extending from the base to support such field coil, a cover plate having a hemispherical central portion, and means for securing such cover plate against the field coil in a position to hold such field coil against such lugs and to protect such armature.

4. In an electric meter, the combination of a base, a rotatable armature supported from the base, a field coil disposed in operative relation to such armature, lugs extending from the base to support such field coil, a cover plate having a hemispherical central portion, means for securing such cover plate against the field coil in a position to hold such coil against such lugs and to protect such armature, and ribs extending from the base within the field coil to properly locate it relatively to the armature.

5. In an electric meter, the combination of a base, a rotatable armature supported from the base, a field coil disposed in operative relation to such armature, lugs extending from the base to support such field coil, a cover plate having a hemispherical central portion, threaded posts secured in such lugs and nuts adapted to engage such posts to secure such cover plate against the field coil to hold the same in place upon the lugs, such cover plate serving in this position to protect such armature, and ribs extending from the base within the field coil to properly locate it relatively to the armature.

In witness whereof, I hereunto subscribe my name this 30th day of December, A. D. 1909.

GEORGE M. WILLIS.

Witnesses:
ALBERT C. BELL,
ROBERT F. BRACKE.

---

Copies of this patent may be obtained for five cents each, by addressing the "Commissioner of Patents, Washington, D. C."